(12) United States Patent
Prout et al.

(10) Patent No.: US 9,188,170 B2
(45) Date of Patent: Nov. 17, 2015

(54) COUPLING AND CONTROL ASSEMBLY (71) Applicant: MEANS INDUSTRIES, INC., Saginaw, MI (US)

(72) Inventors: Jeffrey J. Prout, Freeland, MI (US); Brice A. Pawley, Midland, MI (US); Terry O. Hendrick, Cass City, MI (US)

(73) Assignee: MEANS INDUSTRIES, INC., Saginaw, MI (US)

( * ) Notice: Subject to any disclaimer, the term of this patent is extended or adjusted under 35 U.S.C. 154(b) by 91 days.

(21) Appl. No.: 13/863,540

(22) Filed: Apr. 16, 2013

(65) Prior Publication Data

US 2013/0277164 A1  Oct. 24, 2013

Related U.S. Application Data (60) Provisional application No. 61/635,011, filed on Apr. 18, 2012.

(51) Int. Cl.
| | |
|---|---|
| *F16D 41/16* | (2006.01) |
| *F16D 25/061* | (2006.01) |
| *F16D 11/14* | (2006.01) |
| *F16D 41/12* | (2006.01) |

(52) U.S. Cl.
CPC .............. *F16D 25/061* (2013.01); *F16D 11/14* (2013.01); *F16D 41/125* (2013.01); *F16D 41/16* (2013.01)

(58) Field of Classification Search
CPC ...... F16D 41/16; F16D 41/125; F16D 41/185
USPC ............................................ 192/69.1, 85.18
See application file for complete search history.

(56) References Cited

U.S. PATENT DOCUMENTS

| | | | |
|---|---|---|---|
| 4,050,560 | A | 9/1977 | Torstenfelt |
| 5,070,978 | A | 12/1991 | Pires |
| 5,362,293 | A | 11/1994 | Ramanauskas |
| 5,638,929 | A | 6/1997 | Park |
| 5,678,668 | A | 10/1997 | Sink |
| 5,918,715 | A | 7/1999 | Ruth et al. |
| 5,924,510 | A | 7/1999 | Itoh et al. |
| 5,927,455 | A | 7/1999 | Baker et al. |
| 5,964,331 | A | 10/1999 | Reed et al. |
| 6,116,394 | A | 9/2000 | Ruth |
| 6,186,299 | B1 | 2/2001 | Ruth |

(Continued)

OTHER PUBLICATIONS

International Search Report and the Writen Opinion; International application No. PCT/US2013/036874; date of mailing Jul. 29, 2013.

(Continued)

*Primary Examiner* — Rodney H Bonck
(74) *Attorney, Agent, or Firm* — Brooks Kushman P.C.

(57) ABSTRACT

A coupling and control assembly includes a coupling subassembly and a control subassembly integrated with the coupling subassembly. The control subassembly has a reciprocating member and actuators operatively connected to the reciprocating movement for controlled reciprocating movement therewith to move or pivot respective struts received within pockets of a coupling member of the coupling subassembly. The reciprocating member converts a pressure of a working fluid at its working face to move linearly together with the actuators from its first position which corresponds to a first operating mode of the coupling subassembly to its second position which corresponds to a second operating mode of the coupling subassembly.

21 Claims, 5 Drawing Sheets

(56) References Cited

U.S. PATENT DOCUMENTS

| | | |
|---|---|---|
| 6,193,038 B1 | 2/2001 | Scott et al. |
| 6,244,965 B1 | 6/2001 | Klecker et al. |
| 6,290,044 B1 | 9/2001 | Burgman et al. |
| 6,503,167 B1 | 1/2003 | Sturm |
| 6,571,926 B2 | 6/2003 | Pawley |
| 6,814,201 B2 | 11/2004 | Thomas |
| 6,830,531 B1 | 12/2004 | Koenig et al. |
| 6,953,409 B2 | 10/2005 | Schmidt et al. |
| 7,093,512 B2 | 8/2006 | Ibamoto et al. |
| 7,100,756 B2 | 9/2006 | Kimes et al. |
| 7,198,587 B2 | 4/2007 | Samie et al. |
| 7,223,198 B2 | 5/2007 | Kimes et al. |
| 7,256,510 B2 | 8/2007 | Holmes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,349,010 B2 | 3/2008 | Bryant et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,743,678 B2 | 6/2010 | Wittkipp et al. |
| 7,824,292 B2 | 11/2010 | Samie et al. |
| 7,942,781 B2 | 5/2011 | Kimes |
| 7,992,695 B2 | 8/2011 | Wittkopp et al. |
| 8,011,464 B2 | 9/2011 | Samie et al. |
| 8,042,669 B2 | 10/2011 | Samie et al. |
| 8,051,959 B2 | 11/2011 | Eisengruber |
| 8,056,690 B2 | 11/2011 | Samie et al. |
| 8,061,496 B2 | 11/2011 | Samie et al. |
| 8,079,453 B2 | 12/2011 | Kimes |
| 8,083,042 B2 | 12/2011 | Samie et al. |
| 8,087,502 B2 | 1/2012 | Samie et al. |
| 2002/0027055 A1 | 3/2002 | Le-Calve et al. |
| 2004/0110594 A1 | 6/2004 | Goto |
| 2006/0185957 A1 | 8/2006 | Kimes et al. |
| 2008/0110715 A1 | 5/2008 | Pawley |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2009/0084653 A1* | 4/2009 | Holmes ............... 192/41 A |
| 2009/0098970 A1 | 4/2009 | Kimes |
| 2009/0194381 A1 | 8/2009 | Samie et al. |
| 2010/0063693 A1 | 3/2010 | Lee et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0183806 A1 | 7/2011 | Wittkipp et al. |
| 2011/0214962 A1 | 9/2011 | Shaw et al. |
| 2011/0233026 A1 | 9/2011 | Pawley |
| 2011/0297500 A1 | 12/2011 | Shaw et al. |

OTHER PUBLICATIONS

International Preliminary Report on Patentability; International application No. PCT/US2013/036874; date of issuance of report Oct. 21, 2014.

* cited by examiner

COUPLING AND CONTROL ASSEMBLY

CROSS-REFERENCE TO RELATED APPLICATIONS

This application claims the benefit of U.S. provisional Patent Application filed Apr. 18, 2012, and having U.S. Ser. No. 61/635,011 which is hereby incorporated by reference in its entirety herein.

TECHNICAL FIELD OF THE INVENTION

This invention relates to coupling and control assemblies having reciprocating members to control operating modes of the assemblies and, in particular, to such assemblies having integrated reciprocating members especially for use in vehicular automatic transmissions.

OVERVIEW

A typical one-way clutch (i.e., OWC) includes a first coupling member, a second coupling member, and a first set of locking members between opposing surfaces of the two coupling members. The one-way clutch is designed to lock in one direction and to allow free rotation in the opposite direction. Two types of one-way clutches often used in vehicular, automatic transmissions include:

roller type which includes spring-loaded rollers between inner and outer races of the one-way clutch. (Roller type is also used without springs on some applications); and sprag type which includes asymmetrically shaped wedges located between inner and outer races of the one-way clutch.

One-way clutches are typically used in the transmission to prevent an interruption of drive torque (i.e., power flow) during certain gear shifts and to allow engine braking during coasting.

Controllable or selectable one-way clutches (i.e., OWCs) are a departure from traditional one-way clutch designs. Selectable OWCs often add a second set of struts or locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or actuation mechanism. Movement of this selection mechanism can be between two or more positions which correspond to different operating modes.

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. Nos. 7,258,214 and 7,484,605 disclose an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. patent publications include: 2011/0183806; 2011/0233026; 2011/0297500; 2011/0214962; 2010/0252384; 2010/0230226; 2010/0063693; 2010/0200358; 2009/0098970; 2009/0194381; 2008/0223681; 2008/0110715; 2008/0169166; 2008/0185253; 2006/0185957; 2002/0027055; 2004/0110594 and the following U.S. Pat. Nos. 7,942,781; 8,079,453; 7,992,695; 8,051,959; 8,011,464; 8,042,669; 8,061,496; 8,042,670; 8,056,690; 8,083,042; 8,087,502; 7,824,292; 7,743,678; 7,491,151; 7,464,801; 7,349,010; 7,275,628; 7,256,510; 7,223,198; 7,198,587; 7,100,756; 7,093,512; 6,953,409; 6,830,531; 6,814,201; 6,503,167; 6,193,038; 6,116,394; 6,186,299; 6,571,926; 4,050,560; 5,638,929; 5,362,293; 5,678,668; 5,918,715; 5,070,978; 5,924,510; and 5,964,331.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF EXAMPLE EMBODIMENTS

An object of at least one embodiment of the present invention is to provide an improved, coupling and control assembly having a reciprocating member of a control subassembly integrated with a coupling subassembly of the assembly wherein there is no need for a control element or plate mounted for controlled shifting movement between and relative to the surfaces of first and second coupling members or plates of the coupling subassembly.

In carrying out the above object and other objects of at least one embodiment of the present invention, a coupling and control assembly is provided. The assembly includes a coupling subassembly having first and second operating modes. The subassembly includes first and second coupling members supported for rotation relative to one another about a common rotational axis. The first coupling member has a coupling first face oriented to face axially in a first direction along the rotational axis. The second coupling member has a coupling second face opposed to the first face and oriented to face axially in a second direction along the rotational axis. The second coupling member has a third face spaced from the second face and oriented to face axially in the first direction. The second face has a set of pockets spaced about the rotational axis. Each pocket of the set has a strut received thereby. The first face has a set of locking formations that are engaged by the struts upon projecting outwardly from the set of pockets to prevent relative rotation of the first and second coupling members with respect to each other in at least one direction about the axis. The third face has a set of passages spaced about the rotational axis and in communication with their respective pockets to communicate actuating forces to their respective struts to actuate their respective struts within their respective pockets so that the struts move between engaged and disengaged positions with respect to the first coupling member. The assembly also includes a control subassembly coupled to the second coupling member to rotate therewith to control the operating mode of the coupling subassembly. The control subassembly includes a reciprocating member having a working face oriented to face axially along the rotational axis. The control subassembly also includes a plurality of bi-directionally movable actuators operatively connected to the reciprocating member to move linearly within their respective passages of the third face to provide the actuating forces to their respective struts for selective, small-displacement strut movement. The reciprocating member converts pressure of a working fluid at the working face into linear motion of the reciprocating member and the actuators along the rotational axis relative to the second coupling member between a first position of the reciprocating member which corresponds to the first operating mode of the coupling subassembly and a second position of the reciprocating member which corresponds to the second operating mode of the coupling subassembly.

The assembly may further include at least one biasing member which exerts a biasing force on the reciprocating member along the rotational axis. The pressure of the working fluid causes the reciprocating member to move from its first position to its second position along the rotational axis against the biasing force of the at least one biasing member. In the absence of the pressure of the working fluid the at least one biasing member moves the reciprocating member from the second position back to the first position along the rotational axis.

The assembly may further include a set of biasing members that bias their respective struts against pivotal movement out of their respective pockets toward the locking formations. The actuators pivot ends of their respective struts against the bias of the set of biasing members and into contact with the locking formations to couple the first and second coupling members for rotation with each other in the at least one direction about the rotational axis. The set of biasing members are configured to move their respective struts back into their respective pockets to permit relative rotation of the coupling members in the at least one direction about the rotational axis.

The at least one biasing member may be disposed between the second coupling member and the reciprocating member to urge the reciprocating member towards its first position.

The first position may be an overrun position, the first mode may be an overrun mode, the second position may be a locked position and the second mode may be a locked mode.

The struts may include at least one reverse strut and at least one forward strut.

The assembly may further include an element supported between the first and second coupling members. The element has at least one opening extending completely therethrough to allow the forward and reverse struts to extend therethrough at the same time and fully lock the coupling members together to prevent relative rotation between the coupling members in either direction about the rotation axis.

The reciprocating member may have a set of formations spaced about the rotational axis for supporting the actuators. The actuators may include springs.

The working face may be generally flat and face generally axially. The working face may be generally annular and extend generally radially with respect to the rotational axis.

Further in carrying out the above object and other objects of at least one embodiment of the present invention, a clutch and control assembly is provided. The assembly includes a clutch subassembly having first and second operating modes. The subassembly includes first and second clutch members supported for rotation relative to one another about a common rotational axis. The first clutch member has a coupling first face oriented to face axially in a first direction along the rotational axis and the second clutch member has a coupling second face opposed to the first face and oriented to face axially in a second direction along the rotational axis. The second clutch member has a third face spaced from the second face and oriented to face axially in the first direction. The second face has a set of pockets spaced about the rotational axis. Each pocket of the set has a pivotal strut received thereby and a spring that pivotally biases its strut inwardly therein. The first face has a set of locking formations that are engaged by the struts upon pivoting outwardly from the set of pockets to prevent relative rotation of the first and second clutch members with respect to each other in at least one direction about the axis. The third face has a set of passages spaced about the rotational axis and in communication with their respective pockets to communicate actuating forces to their respective struts to actuate their respective struts within their respective pockets so that the struts move between engaged and disengaged positions with respect to the first clutch member. The assembly also includes a control subassembly coupled to the second clutch member to rotate therewith to control the operating mode of the clutch subassembly. The control subassembly includes a reciprocating member having a working face oriented to face axially along the rotational axis. The control subassembly also includes a plurality of bi-directionally movable actuators operatively connected to the reciprocating member to move linearly within their respective passages of the third face to provide the actuating forces to their respective struts for selective, small-displacement strut movement. The reciprocating member converts pressure of a working fluid at the working face into linear motion of the reciprocating member and the actuators along the rotational axis relative to the second clutch member between a first position of the reciprocating member which corresponds to the first operating mode of the clutch subassembly and a second position of the reciprocating member which corresponds to the second operating mode of the clutch subassembly.

The assembly may further include at least one biasing member which exerts a biasing force on the reciprocating member along the rotational axis. Pressure of the working fluid causes the reciprocating member to move from its first position to its second position along the rotational axis against the biasing force of the at least one biasing member. In the absence of the pressure of the working fluid the at least one biasing member moves the reciprocating member from the second position back to the first position along the rotational axis.

The actuators may pivot ends of their respective struts against the bias of their respective springs and into contact with the locking formations to couple the first and second clutch members for rotation with each other in the at least one direction about the rotational axis. The springs may be configured to move the ends of their respective struts back into their respective pockets to permit relative rotation of the clutch members in the at least one direction about the rotational axis.

The at least one biasing member is disposed between the second clutch member and the reciprocating member to urge the reciprocating member toward its first position.

The first position may be an overrun position, the first mode may be an overrun mode, the second position may be a locked position and the second mode may be a locked mode.

The struts may include at least one reverse strut and at least one forward strut.

The assembly may further include an element supported between the first and second clutch members. The element may have at least one opening extending completely therethrough to allow the forward and reverse struts to extend therethrough at the same time and fully lock the clutch members together to prevent relative rotation between the clutch members in either direction about the rotation axis.

The reciprocating member may have a set of formations spaced about the rotational axis for supporting the actuators. The actuators may include springs.

The reciprocating member may be an annular piston member.

Objects, features, and advantages of the present invention are readily apparent from the following detailed description

DETAILED DESCRIPTION OF EXAMPLE EMBODIMENT(S)

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
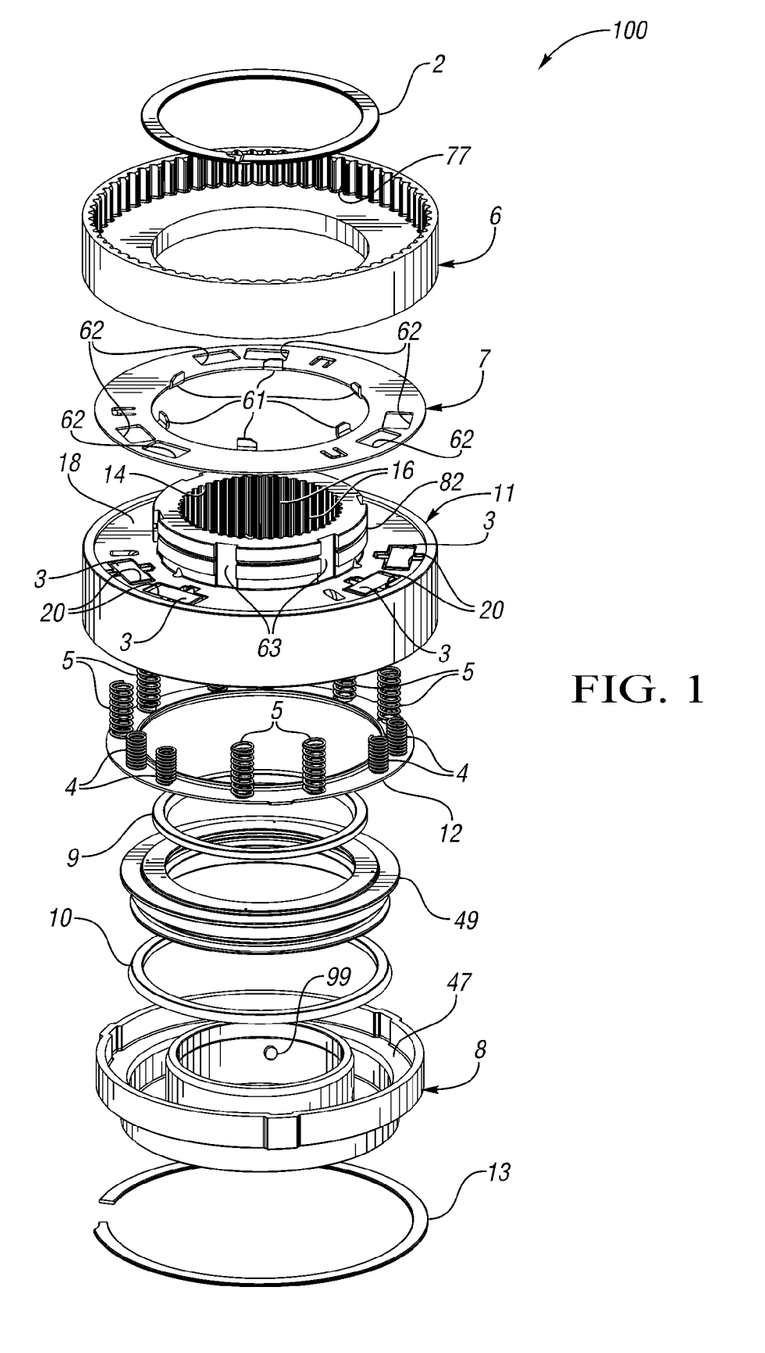
FIG. 1 is an exploded perspective view of a coupling and control assembly taken in a first direction and constructed in accordance with at least one embodiment of the present invention.
Figure 2:
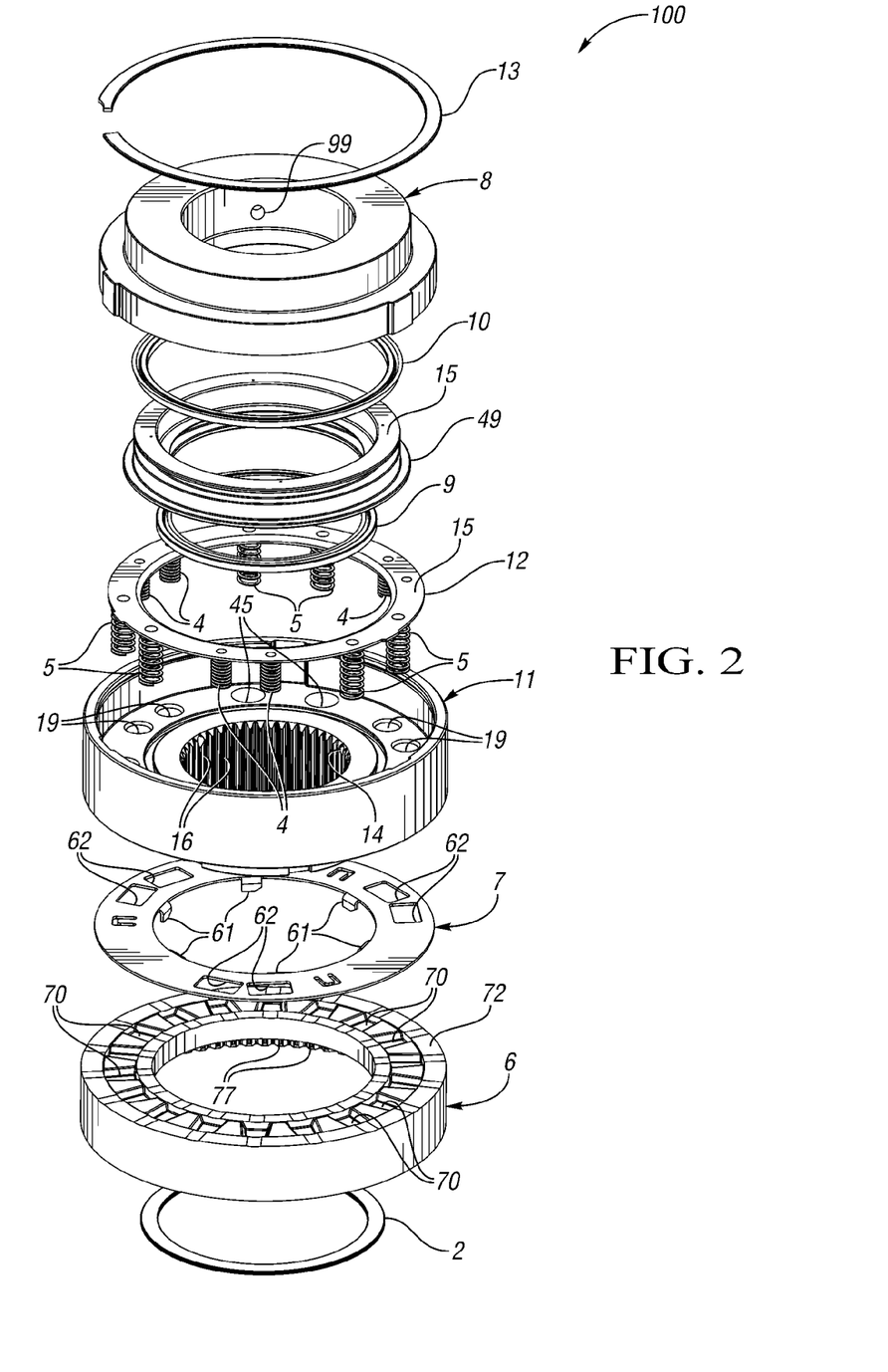
FIG. 2 is an exploded perspective view of the coupling and control assembly of FIG. 1 but taken in a direction opposite the direction of FIG. 1.
Figure 3:
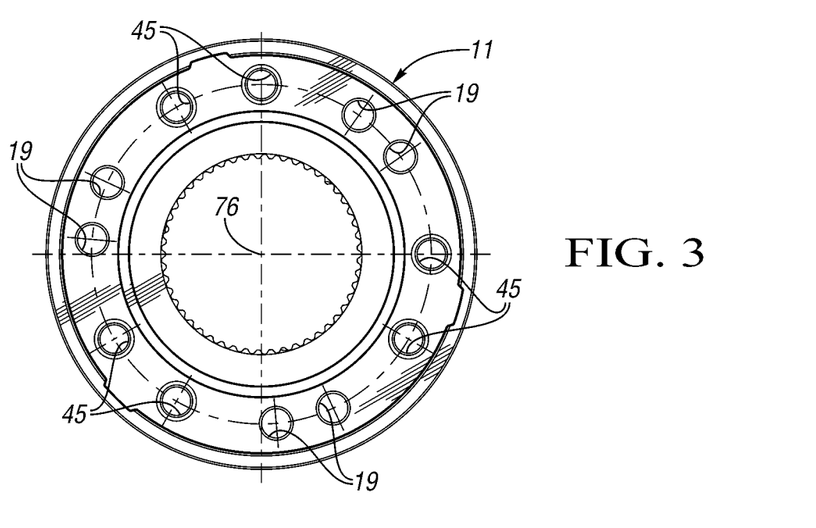
FIG. 3 is a back plan view of a pocket plate of the assembly.
Figure 8:
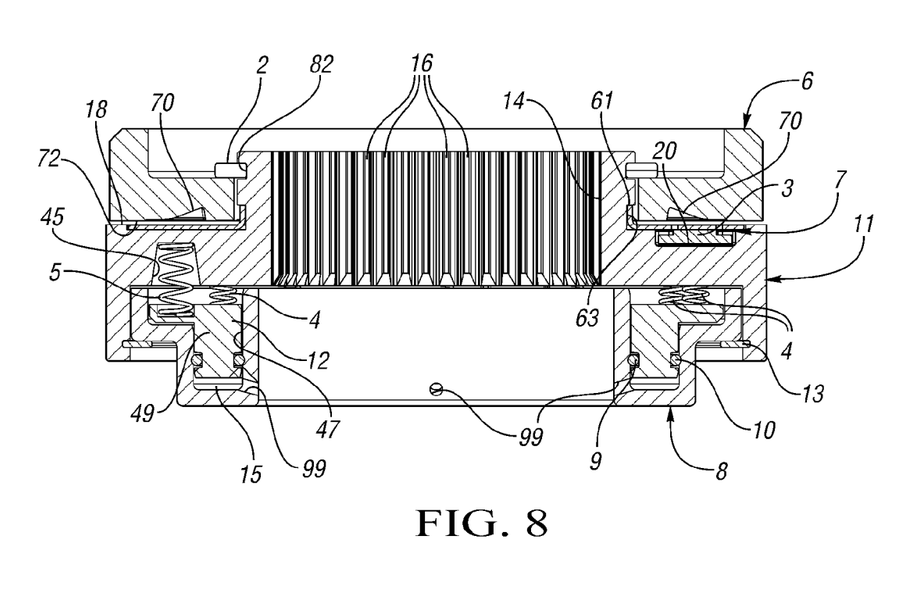
FIG. 8 is a sectional view of another slightly different embodiment of the assembly.

A coupling and control assembly constructed in accordance with at least two embodiment of the present invention is generally indicated at 100 in FIGS. 1 and 2. The assembly 100 includes a coupling subassembly and a control subassembly. The coupling subassembly includes an annular coupling or clutch member or pocket plate, generally indicated at 11. An inner axially-extending surface 14 of the plate 11 has inner splines 16 as best shown in FIG. 8.

An inner radially extending face or surface 18 of the plate 11 is formed with spaced reverse pockets 20, in which reverse struts 3 are received and retained. One end portion of each reverse strut 3 is normally biased outwardly by a coil spring 1 disposed with an aperture of the pocket 20. The opposite end portion of each reverse strut 3 is controllably actuated by an actuator or spring 4 when an annular piston or reciprocating member 12, to which the springs 4 are operatively connected, linearly moves. The member 12 linearly moves upon receiving a pressure from a working fluid in fluid communication with a working face 15 of the member 12. The working fluid flows through apertures 99 formed through the inner wall of an engagement plate 8 causing the springs 4 to linearly move towards the opposite end portions of the struts 3 within passages 19 in communication with their respective pockets 20 to overcome the bias of the springs 1. Preferably, three reverse struts 3 are provided. However, it is to be understood that a greater or lesser member of reverse struts 3 may be provided.

The face or surface 18 of the pocket plate 11 is also formed with spaced forward pockets 20 in which forward struts 3 are received and retained. Like the reverse struts 3, one end portion of each forward strut 3 is normally biased outwardly by a coil spring 1 disposed within an aperture of the pocket 20. The opposite end portions of the struts 3 are controllably biased outwardly by coil springs 4 when the annular reciprocating member 12 to which the springs 4 are operatively connected moves towards the opposite end portions of the forward struts 3 to overcome the bias of their coil springs 1. Again, movement of the member 12 is caused by the pressure of the working fluid. Preferably, three forward struts 3 are provided. However, it is to be understood that a greater or lesser number of forward struts may be provided. Also, it is to be understood that, instead of springs 4 the reciprocating member 12 may be operatively connected to other types of strut actuators such as pins to linearly move therewith.

The annular reciprocating member 12 has a plurality of spaced formations 36 (FIG. 7) formed on an outer end face or surface of the reciprocating member 12 to operatively connect the springs 4 to the member 12. The reciprocating member 12 also supports a plurality of biasing coil springs 5 which extend between apertures formed in the outer end face or surface of the reciprocating member 12 and apertures 45 formed in the face of the plate 11 to bias the reciprocating member 12 and the coupling member 11 apart. However, it is to be understood that instead of biasing the reciprocating member 12 and the pocket plate 11 apart, the biasing springs 5 may bias the member 12 and the plate 11 together in which case the springs 4 normally urge the struts 3 outwardly in the absence of the pressure of the working fluid acting on the working face 15 of the member 12. In this case, the pressure of the working fluid on an opposite working face of the member 12 would cause the member 12 to move away from the plate 11 so that the springs 4 don't bias the struts 3 outwardly from their pockets 20.

Figure 7:
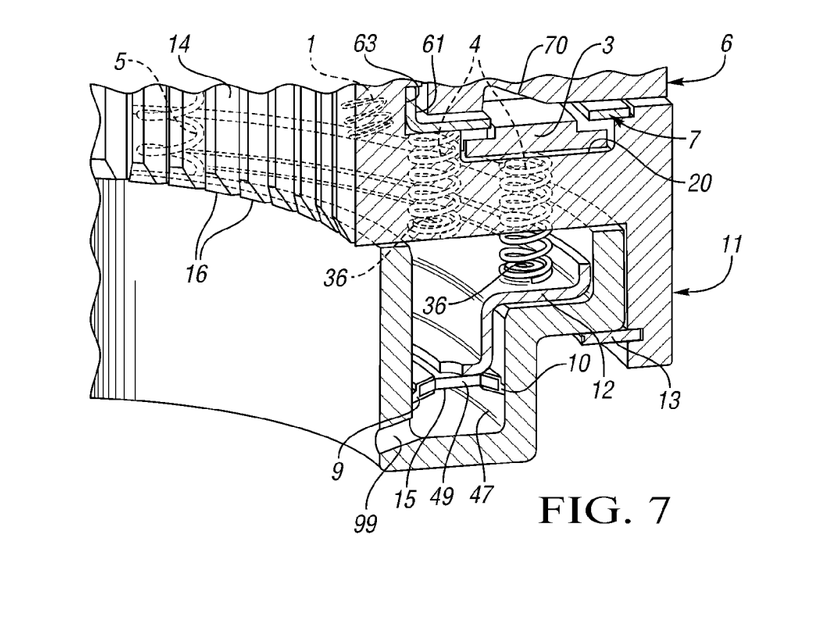
FIG. 7 is a perspective view, partially broken away and in cross section, of a slightly different embodiment of the assembly of FIG. 1.

The control subassembly of the assembly 100 also includes a snap ring 13 which is disposed in a groove formed in an inner axial surface of the plate 11 to hold the engagement plate or end housing 8 within the pocket plate 11. The end housing 8, which is supported for rotation with the pocket plate 11, has an inner walls which define an annular chamber 47 in which the annular reciprocating member 12 is slidably mounted. In one embodiment, a pair of O-rings 9 and 10 sealingly, slidably support a lower annular part 49 of the reciprocating member 12 within the chamber 47 (FIG. 8). In another embodiment, the O-rings 9 and 10 sealingly, slidably supports a lower portion of the piston member 12 within the chamber 47 (FIG. 7).

Figure 4:
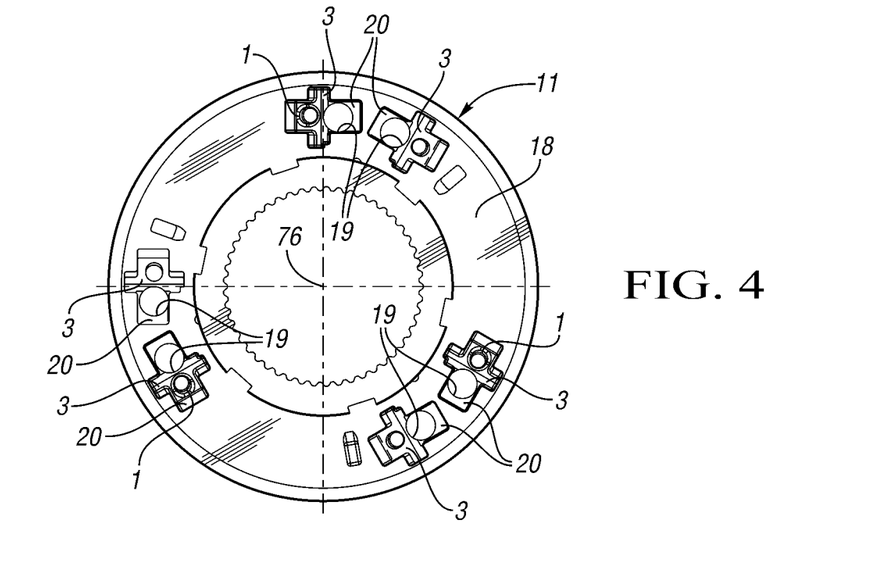
FIG. 4 is a front plan view of the pocket plate of FIG. 3 including struts.
Figure 5:
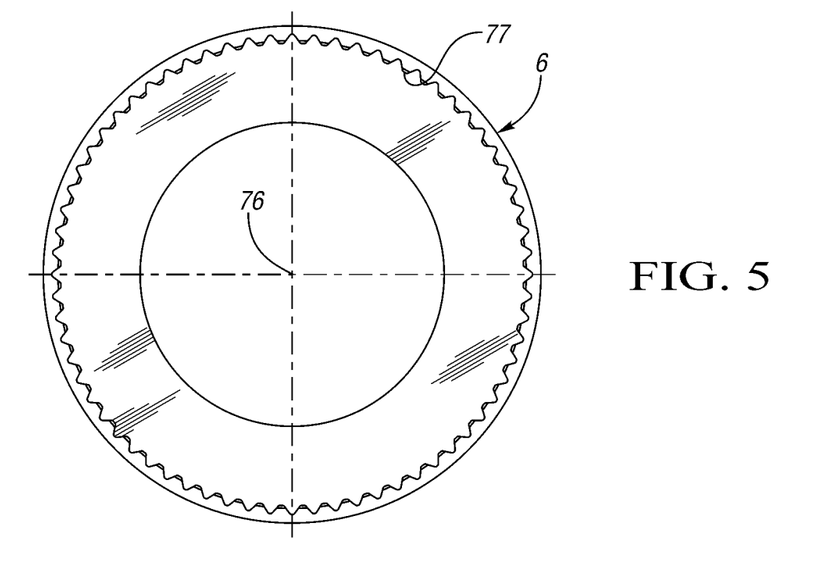
FIG. 5 is a back plan view of a notch plate of the assembly.
Figure 6:
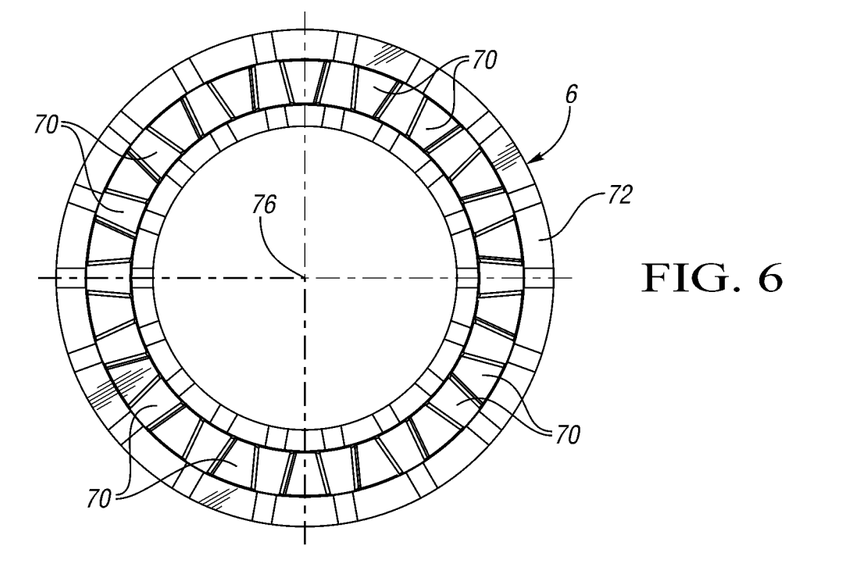
FIG. 6 is a front plan view of the notch plate of the assembly.

The coupling subassembly of the assembly 100 also includes a cover plate or element, generally indicated at 7, having a plurality of spaced apertures 62 extending completely therethrough to allow the reverse struts 3 and the forward struts 3 to pivot in their pockets 20 (by the forces applied by the actuators or springs 4) and extend through their corresponding apertures 62 to engage spaced locking formations or notches 70 formed in a radially extending face or surface 72 (FIGS. 4 and 7) of a notch plate, generally indicated at 6. The struts 3 engage the locking formations 70 during linear movement of the reciprocating member 12 towards the pocket plate 11 along a common rotational axis 76. The notch plate 6 is permitted to rotate relative to the pocket plate 11 about the axis 76. The cover plate 7 is prevented from rotating relative to the pocket plate 11 by shoulders 61 (FIG. 8) circumferentially spaced about the outer periphery of the cover plate 7 and which fit within corresponding apertures 63 formed in an outer axial surface of the pocket plate 11.

A snap ring 2 is disposed within a groove 82 formed in the outer axial surface of the pocket plate 11 to retain the notch plate 6 and the pocket plate 11 together. The ring 2 holds the plates 6, 7 and 11 together and limit their axial movement relative to one another. An inner axially extending surface of the notch plate 6 has inner splines 77.

The forward struts 3 lock the notch plate 6 to the pocket plate 11 in one direction of relative rotational movement about the axis 76 but allow free-wheeling in the opposite direction about the axis 76. The reverse struts 3 perform the same locking function in the opposite direction.

Seals are provided between the sliding reciprocating member 12 and the walls of the chamber 47 so that the pressurized working fluid at the working face 15 of the reciprocating member 12 does not leak past it and reduce the efficiency of the control subassembly. In one embodiment, the seals are provided by the O-rings 9 and 10. The O-rings 9 and 10 are located in circular grooves in the walls of the piston member 12. In the other embodiment, the O-rings 9 and 10 are fit tightly about the ends of the part 49 to seal the member 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A coupling and control assembly comprising:
    a coupling subassembly having first and second operating modes, the subassembly including first and second coupling members supported for rotation relative to one another about a common rotational axis, the first coupling member having a coupling first face oriented to face axially in a first direction along the rotational axis and the second coupling member having a coupling second face opposed to the first face and oriented to face axially in a second direction along the rotational axis, the second coupling member having a third face spaced from the second face and oriented to face axially in the first direction;
    the second face having a set of pockets spaced about the rotational axis, each pocket of the set having a strut received thereby;
    the first face having a set of locking formations that are engaged by the struts upon projecting outwardly from the set of pockets to prevent relative rotation of the first and second coupling members with respect to each other in at least one direction about the axis;
    the third face having a set of passages spaced about the rotational axis and in communication with their respective pockets to communicate actuating forces to their respective struts to actuate their respective struts within their respective pockets so that the struts move between engaged and disengaged positions with respect to the first coupling member; and
    a control subassembly coupled to the second coupling member to rotate therewith to control the operating mode of the coupling subassembly, the control subassembly including:
        an integral, unitary reciprocating member having a first face oriented to face axially along the rotational axis in the first direction and a second face spaced from the first face of the reciprocating member and oriented to face axially along the rotational axis in the second direction, one of the faces of the reciprocating member being a working face; and
        a plurality of bi-directionally movable actuators supported by the reciprocating member to move linearly with the reciprocating member so that the actuators move linearly within their respective passages of the third face to provide the actuating forces to their respective struts for selective, small-displacement strut movement, the working face of the reciprocating member being impinged by a working fluid in direct contact therewith to provide linear motion of the reciprocating member and the actuators along the rotational axis relative to the second coupling member between a first position of the reciprocating member which corresponds to the first operating mode of the coupling subassembly and a second position of the reciprocating member which corresponds to the second operating mode of the coupling subassembly wherein the actuators and the reciprocating member are operatively connected together to move in unison during the entire linear motion between the first and second positions.

2. The assembly as claimed in claim 1, further comprising at least one biasing member which exerts a biasing force on the reciprocating member along the rotational axis wherein the pressure of the working fluid causes the reciprocating member to move from its first position to its second position along the rotational axis against the biasing force of the at least one biasing member and wherein in the absence of the pressure of the working fluid the at least one biasing member moves the reciprocating member from the second position back to the first position along the rotational axis.

3. The assembly as claimed in claim 2, further comprising a set of biasing members that bias their respective struts against pivotal movement out of their respective pockets toward the locking formations wherein the actuators pivot ends of their respective struts against the bias of the set of biasing members and into contact with the locking formations to couple the first and second coupling members for rotation with each other in the at least one direction about the rotational axis and wherein the set of biasing members are configured to move their respective struts back into their respective pockets to permit relative rotation of the coupling members in the at least one direction about the rotational axis.

4. The assembly as claimed in claim 2, wherein the at least one biasing member is disposed between the second coupling member and the reciprocating member to urge the reciprocating member towards its first position.

5. The assembly as claimed in claim 1, wherein the first position is an overrun position, the first mode is an overrun mode, the second position is a locked position and the second mode is a locked mode.

6. The assembly as claimed in claim 1, wherein the struts include at least one reverse strut and at least one forward strut.

7. The assembly as claimed in claim 6, further comprising an element supported between the first and second coupling members, the element having at least one opening extending completely therethrough to allow the forward and reverse struts to extend therethrough at the same time and fully lock the coupling members together to prevent relative rotation between the coupling members in either direction about the rotation axis.

8. The assembly as claimed in claim 1, wherein the reciprocating member has a set of formations spaced about the rotational axis for supporting the actuators.

9. The assembly as claimed in claim 1, wherein the actuators include springs.

10. The assembly as claimed in claim 1, wherein the working face is generally flat.

11. The assembly as claimed in claim 1, wherein the working face is generally annular and extends generally radially with respect to the rotational axis.

12. A clutch and control assembly comprising:
a clutch subassembly having first and second operating modes, the subassembly including first and second clutch members supported for rotation relative to one another about a common rotational axis, the first clutch member having a coupling first face oriented to face axially in a first direction along the rotational axis and the second clutch member having a coupling second face opposed to the first face and oriented to face axially in a second direction along the rotational axis, the second clutch member having a third face spaced from the second face and oriented to face axially in the first direction;
the second face having a set of pockets spaced about the rotational axis, each pocket of the set having a pivotal strut received thereby and a spring that pivotally biases its strut inwardly therein;
the first face having a set of locking formations that are engaged by the struts upon pivoting outwardly from the set of pockets to prevent relative rotation of the first and second clutch members with respect to each other in at least one direction about the axis;
the third face having a set of passages spaced about the rotational axis and in communication with their respective pockets to communicate actuating forces to their respective struts to actuate their respective struts within their respective pockets so that the struts move between engaged and disengaged positions with respect to the first clutch member; and
a control subassembly coupled to the second clutch member to rotate therewith to control the operating mode of the clutch subassembly, the control subassembly including:
an integral, unitary reciprocating member having a first face oriented to face axially along the rotational axis in the first direction and a second face spaced from the first face of the reciprocating member and oriented to face axially along the rotational axis in the second direction, one of the faces of the reciprocating member being a working face; and
a plurality of bi-directionally movable actuators supported by the reciprocating member to move linearly with the reciprocating member so that the actuators move linearly within their respective passages of the third face to provide the actuating forces to their respective struts for selective, small-displacement strut movement, the working face of the reciprocating member being impinged by a working fluid in direct contact therewith to provide linear motion of the reciprocating member and the actuators along the rotational axis relative to the second clutch member between a first position of the reciprocating member which corresponds to the first operating mode of the clutch subassembly and a second position of the reciprocating member which corresponds to the second operating mode of the clutch subassembly wherein the actuators and the reciprocating member are operatively connected together to move in unison during the entire linear motion between the first and second positions.

13. The assembly as claimed in claim 12, further comprising at least one biasing member which exerts a biasing force on the reciprocating member along the rotational axis wherein pressure of the working fluid causes the reciprocating member to move from its first position to its second position along the rotational axis against the biasing force of the at least one biasing member and wherein in the absence of the pressure of the working fluid the at least one biasing member moves the reciprocating member from the second position back to the first position along the rotational axis.

14. The assembly as claimed in claim 13, wherein the actuators pivot ends of their respective struts against the bias of their respective springs and into contact with the locking formations to couple the first and second clutch members for rotation with each other in the at least one direction about the rotational axis and wherein the springs are configured to move the ends of their respective struts back into their respective pockets to permit relative rotation of the clutch members in the at least one direction about the rotational axis.

15. The assembly as claimed in claim 12, wherein the at least one biasing member is disposed between the second clutch member and the reciprocating member to urge the reciprocating member toward its first position.

16. The assembly as claimed in claim 12, wherein the first position is an overrun position, the first mode is an overrun mode, the second position is a locked position and the second mode is a locked mode.

17. The assembly as claimed in claim 12, wherein the struts include at least one reverse strut and at least one forward strut.

18. The assembly as claimed in claim 17, further comprising an element supported between the first and second clutch members, the element having at least one opening extending completely therethrough to allow the forward and reverse struts to extend therethrough at the same time and fully lock the clutch members together to prevent relative rotation between the clutch members in either direction about the rotation axis.

19. The assembly as claimed in claim 12, wherein the reciprocating member has a set of formations spaced about the rotational axis for supporting the actuators.

20. The assembly as claimed in claim 12, wherein the actuators include springs.

21. The assembly as claimed in claim 12, wherein the reciprocating member is an annular piston member.

* * * * *